April 27, 1965    V. C. BELT    3,180,601
PORTABLE BIN
Filed Dec. 7, 1962    5 Sheets-Sheet 1
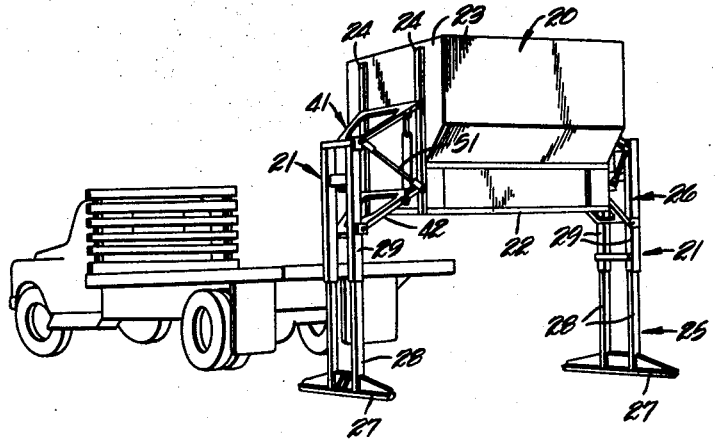
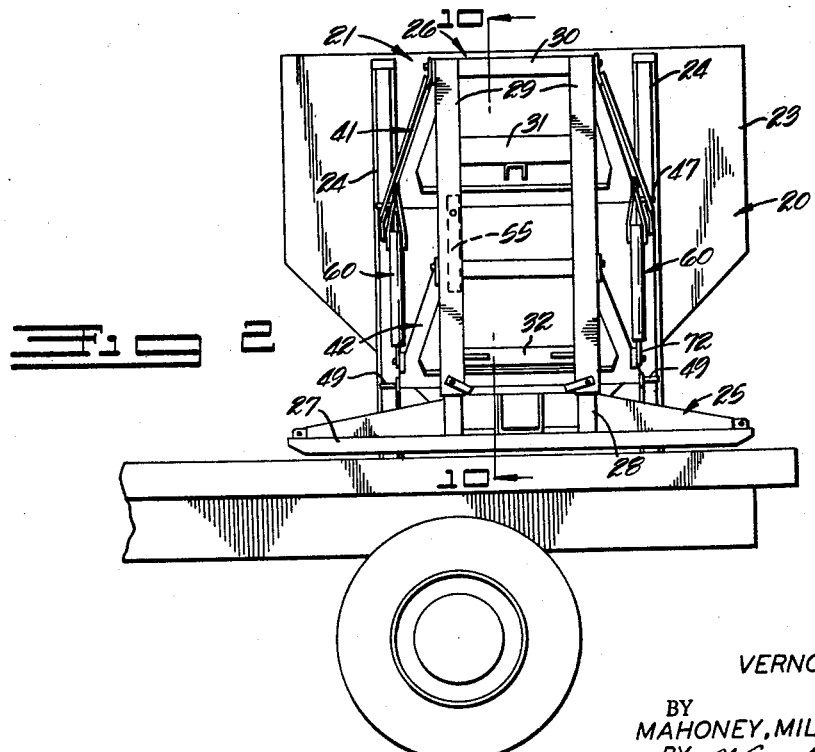
INVENTOR.
VERNON C. BELT
BY MAHONEY, MILLER & RAMBO
BY
ATTORNEYS.

April 27, 1965  V. C. BELT  3,180,601
PORTABLE BIN
Filed Dec. 7, 1962  5 Sheets-Sheet 2
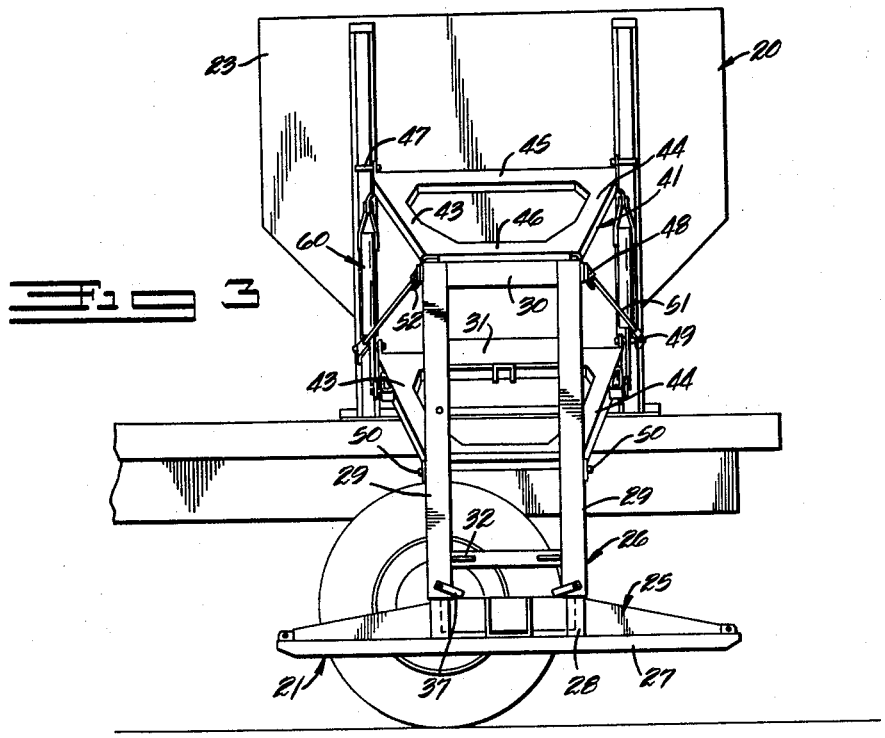
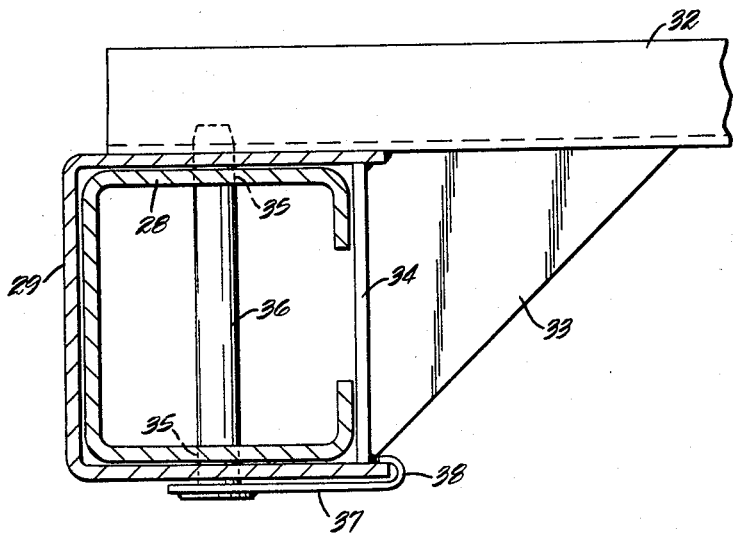
INVENTOR.
VERNON C. BELT
BY MAHONEY, MILLER & RAMBO
BY W. S. Rambo
ATTORNEYS.

April 27, 1965     V. C. BELT     3,180,601
PORTABLE BIN

Filed Dec. 7, 1962     5 Sheets-Sheet 3

INVENTOR.
VERNON C. BELT
BY
MAHONEY, MILLER & RAMBO
BY W. A. Rambo
ATTORNEYS.

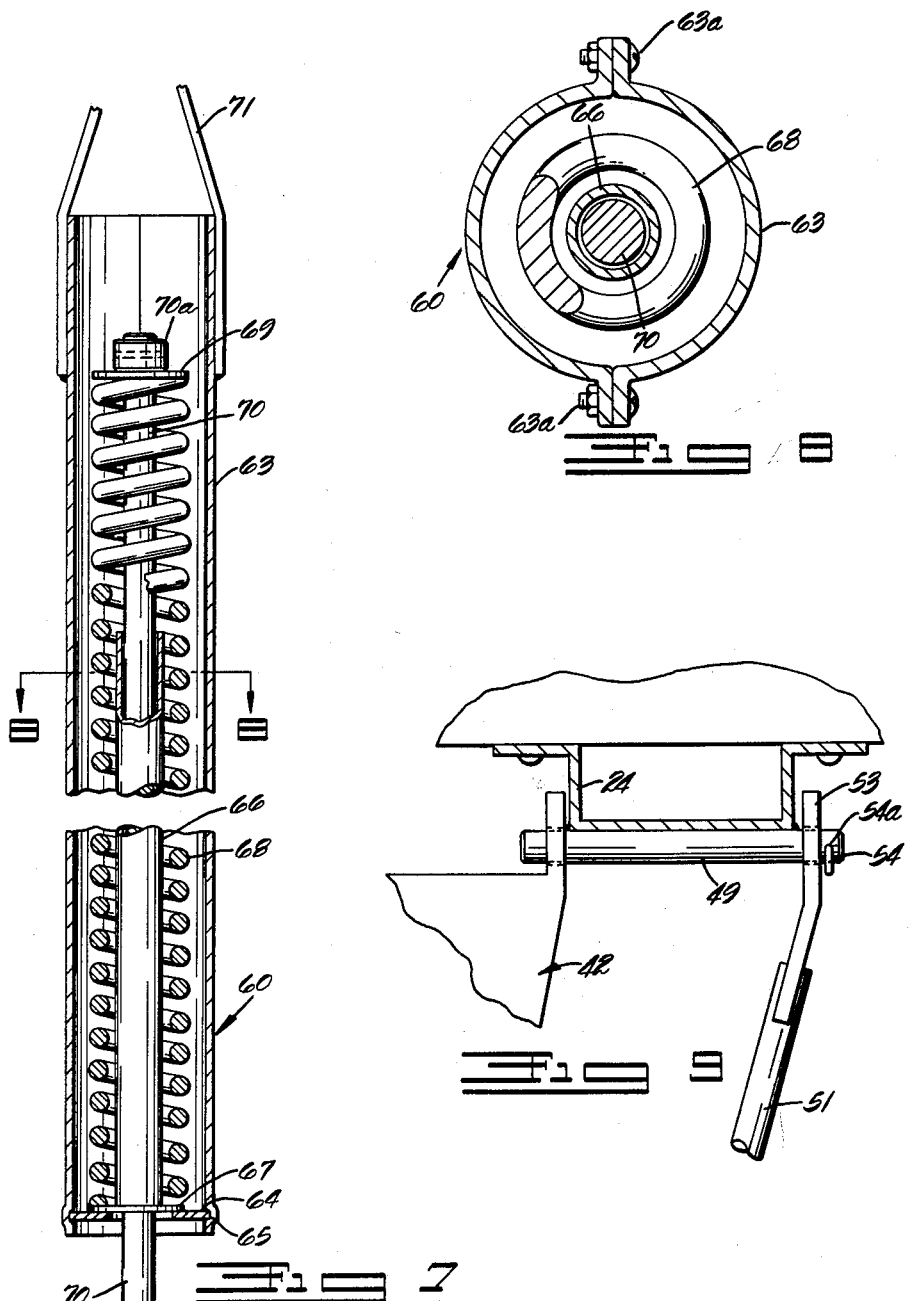

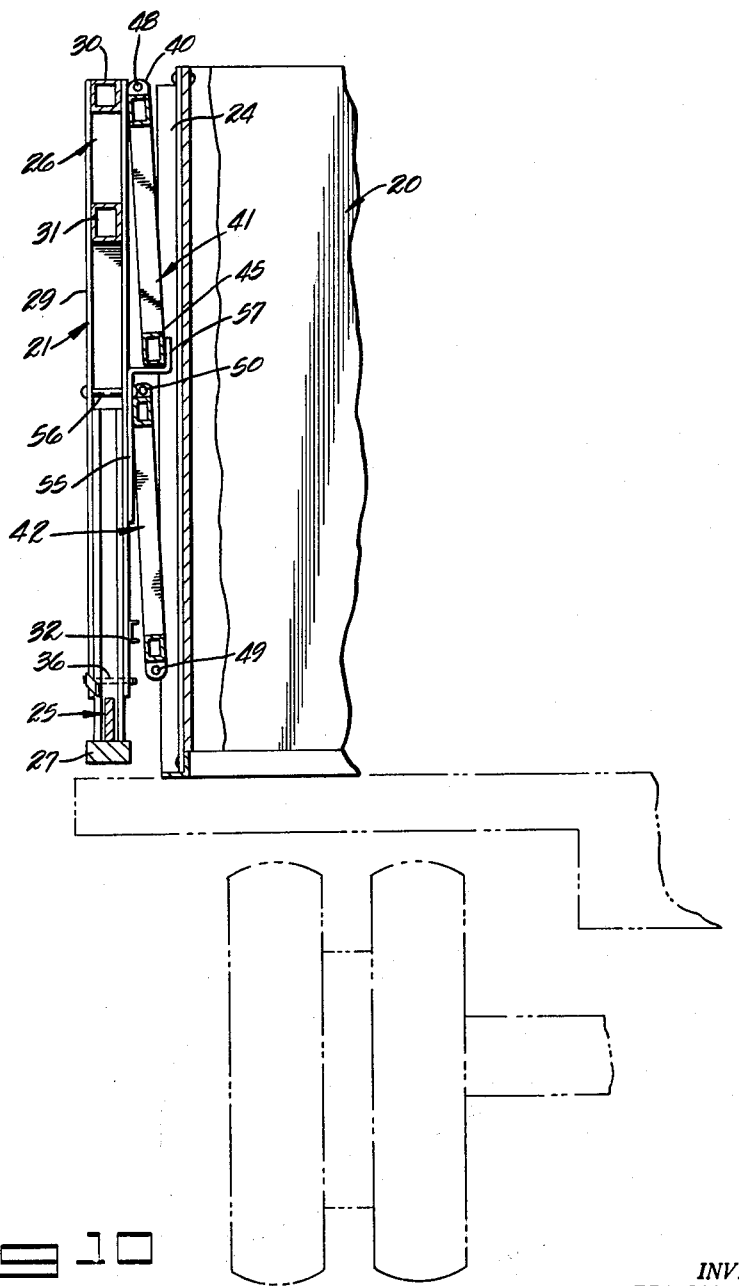

United States Patent Office 3,180,601
Patented Apr. 27, 1965

3,180,601
PORTABLE BIN
Vernon C. Belt, Pleasant Township, Franklin County, Ohio, assignor to The Belt Corporation, Orient, Ohio, a corporation of Ohio
Filed Dec. 7, 1962, Ser. No. 243,074
3 Claims. (Cl. 248—151)

This invention relates to a portable bin. It has to do, more particularly, with a portable bin of the type suitable for containing and dispensing bulk materials such as feeds, grain, salt, industrial chemicals, sand, aggregates, small parts, etc. It relates mainly to a supporting arrangement for a portable bin which normally supports it for effective use but which is so adjustable that the bin can be moved readily to various locations by a flat-bed truck or similar vehicle.

The present invention deals more particularly with a novel supporting stand for the bin which comprises a pair of supporting leg assemblies arranged for both vertical and lateral adjustment between supporting and non-supporting positions. The leg assemblies are such that the legs can be extended to an erected position at which they support the bin in an elevated position with respect to ground or a floor surface, so that material can be dispensed from the bin into a vehicle body or the like moved therebeneath. In this erected position, also, the flat bed of a transporting vehicle can be driven beneath the bin and the leg assemblies retracted and collapsed, so as to load the bin upon the vehicle and within the lateral confines thereof. The supporting leg assemblies are such that they may be effectively locked either in their erected, supporting positions or in their retracted, transport positions. Furthermore, the leg assemblies can be moved between their various positions by one man, even though it is a relatively heavy structure, due to novel counterbalancing means incorporated in the leg assemblies.

The primary object of the present invention is to provide a novel and efficient retractable and extensible supporting stand for bulk storage bins or similar receptacles which permits the bin or receptacle to be easily and simply transported from one location to another on a flat-bed truck or similar vehicle, and erected for operation without dismantling the structural components of the stand or bin.

Another object is to provide a portable storage bin having sets of supporting legs or stands which may be readily and easily moved between relatively retracted positions of transport and relatively extended or erected positions of support by but a single man.

Various additional objects and advantages will become more readily apparent by reference to the following detailed description of the invention.

The preferred embodiment of this invention is illustrated in the accompanying drawings, but it is to be understood that specific details thereof may be varied without departing from basic principles of the invention.

In the drawings:

FIGURE 1 is a diagrammatic perspective view showing the present portable bin in an erected position, and illustrating how a flat-bed truck may be moved into or out of supporting position relative thereto.

FIGURE 2 is a side elevational view illustrating the bin with its leg structures retracted and with the bin supported on the bed of a truck for transportation.

FIGURE 3 is a view similar to FIGURE 2, but showing one of the leg structures partially extended downwardly and outwardly toward supporting position.

FIGURE 6 is an enlarged horizontal sectional view taken along line 6—6 of FIGURE 4 showing one of the telescoping leg assemblies.

FIGURE 7 is an enlarged vertical sectional view taken axially through one of the counterbalance units along line 7—7 of FIGURE 5.

FIGURE 8 is an enlarged transverse sectional view taken through the counterbalance unit along line 8—8 of FIGURE 7.

FIGURE 9 is an enlarged horizontal sectional view taken along line 9—9 of FIGURE 4 and showing one of the pivot or hinge pin assemblies for the leg structures.

FIGURE 10 is an enlarged vertical sectional view taken along line 10—10 of FIGURE 2 showing the latching means for locking the leg structure in its upper or retracted position.

Figure 4:
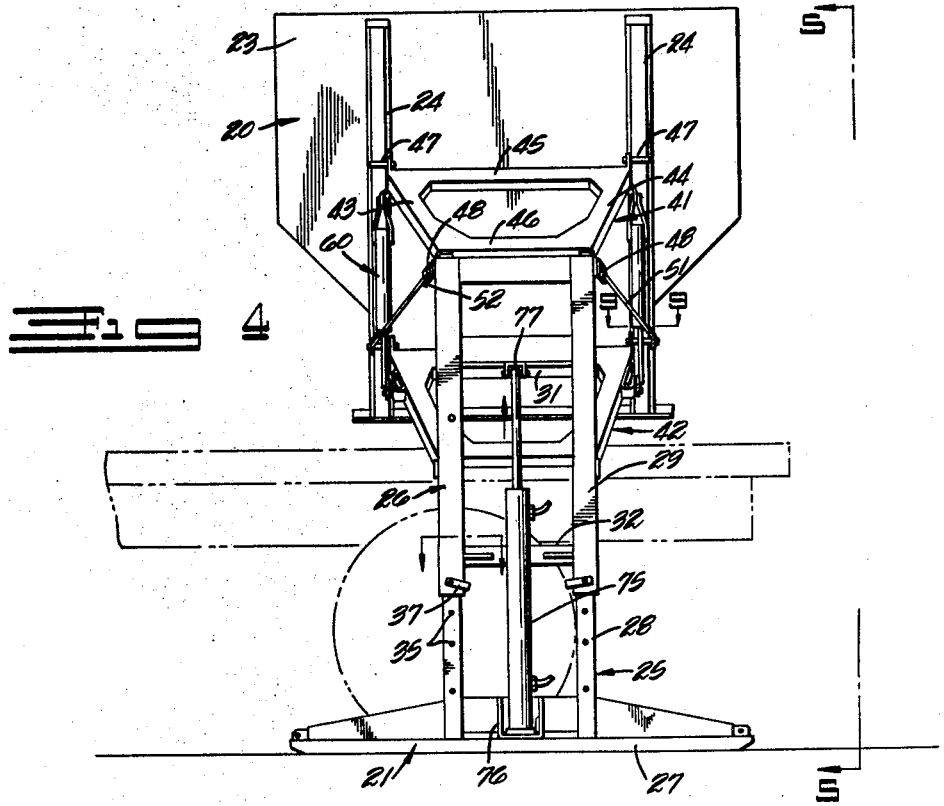
FIGURE 4 is a similar view, but showing the leg structure in completely extended, supporting position with the bin lifted off the bed of the truck.

With reference to the drawings, there is illustrated a portable bin which comprises generally a central hopper or receptacle 20 having opposed supporting leg assemblies or standards 21 at the opposite ends or sides thereof. The standards 21 are adjustable relative to the hopper 20 both laterally and vertically, as will be explained later in detail. The adjustment of the standards 21 permits the hopper 20 to be erected in a normal, relatively elevated, operative position, as indicated in FIGURE 1, or to be lowered and supported on a flat-bed truck or similar vehicle, as indicated in FIGURE 2, for transport from one location to another.

The details of the construction of the hopper or receptacle body 20 are not part of the present invention. In general, however, the hopper is constructed in the usual manner and includes frame members 22 and associated end and side walls 23 assembled in any suitable manner. At each end of the hopper, a pair of upright inwardly turned flanged supporting channels 24 are provided which are suitably attached to the corresponding end wall of the hopper in spaced parallel relationship. Each pair of channels 24 provide means for attaching the associated standards 21 thereto. The standards 21 are identical and a description of one will suffice for both.

Each standard 21 comprises a lower pedestal section 25 (FIGURE 4) and an upper main section 26. The pedestal section 25 includes an elongated, horizontal foot 27 having a pair of vertical channel members 28 rigidly secured thereto. The channel members 28 are disposed in spaced parallel relationship and telescope upwardly within the main channel members 29 which are similarly spaced. The channel members 29 are rigidly secured together in spaced parallel relationship by means of rigid cross members or braces 30 and 31.

As indicated in FIGURE 6, the inner leg channels 28 are of smaller cross section than the main leg channels 29 and slide therein. Thus, the members 28 are telescopically connected to the members 29. It will further be noted that the channels 29 are additionally connected together by a cross brace 32 extending across the channels 29 adjacent their lower ends. This brace is provided at each end with gussets 33 (FIGURE 6) carrying upright plates 34 welded in place across the open sides of the channels 29 to prevent spreading of the channels and also to prevent the smaller channels 28 from being displaced through the open sides thereof. Each of the channels 28 is provided with a set of vertically spaced, transverse registering pin-receiving openings 35 for receiving a locking pin 36. This pin 36 passes through a single pair of aligned openings in the flanges of the outer channel 29. Thus, with this arrangement, the pin 36 may be placed in any selected set of openings 35 to lock the inner channel 28 in a selected vertical position relaitve to the outer channel leg 29.

To facilitate removal of the pin 36, it is provided with a handle 37 which has a hook 38 (FIGURE 6) for engaging the edge of the associated flange of the channel 29 to keep the pin in locking position.

Each pair of channel legs 29 is connected to the associated end of the hopper 20 for swinging movement in a vertical plane, so that the same will move both laterally and vertically. For this purpose, a kinematic linkage is provided for connecting each standard 21 to the stationary frame channels 24. This linkage comprises an upper yoke-like frame 41 and a lower yoke-like frame 42. Each frame comprises relatively spaced side arms 43 and 44 (FIGURES 3 and 4) joined by rear and front braces 45 and 46, respectively.

The frames 41 and 42 are pivotally connected between the upper main leg channels 29 and the upright frame supports 24 in vertically spaced, parallel relationship and serve to keep the leg sections 26 parallel to the frame supports 24 in all vertical positions of the leg sections. As will be noted from FIGURES 3, 4 and 9, the inner corners of the upper frame 41 fit within the channels 24 and are pivoted thereto by pivot pins 47 welded to the channels 24. The outer corners of the upper frame 41 fit within lugs 40 provided on the upper legs 29 and are connected thereto by pivot pins 48. Similarly, the inner corners of the lower frame 42 are connected to the supports 24 by pivot pins 49 welded thereto and the outer corners of the frame 42 are connected to the upper legs 29 by pins 50.

In order to lock the standard 21 in a lowered position, a locking stay or diagonal brace 51 is provided on each side of the linkage, as shown in FIGURES 1, 3, 4 and 5. The locking brace 51 is in the form of a rod which has a clevis 52 on its upper and outer end that is pivoted on one of the pivot pins 48. The lower and inner end of the brace 51 is provided with an eye member 53 (FIGURES 5 and 9) which is adapted to slip over the outer end of one of the pivot pins 49 carried by the frame supports 24. The outer pivot connection at the pin 48 has sufficient play to permit enough lateral movement of the eye 53 to slip it on and off the outer end of the pin 49. To retain the eye 53 on the pin 49 when desired, a removable key 54 is provided for insertion through a transverse opening 54a formed in the outer end of the pin 49.

When it is desired to transport the storage bin, the standards are swung upwardly and inwardly against the end of the hopper 20. At this time, the bottom of the hopper will be resting on a suitable support, such as the flat-bed truck illustrated in FIGURE 2. To maintain the standards 21 in their retracted positions, a latching means is provided on each of the upper leg sections 26. This latching means is shown best in FIGURE 10 and comprises a latching lever 55 which is pivoted to one of the main channel legs 29 at the inner side thereof. This lever is pivoted to the channel 29 by the pivot pin 56 so that its lower portion tends to hang downwardly with a pendulum effect. The upper end is offset inwardly to provide a keeper lug 57. When the standard 21 is swung upwardly and inwardly as in FIGURE 10, the keeper lug 57 may be engaged behind the cross brace portion 45 of the upper frame 41. To engage the keeper lug, the lower handle portion of the latch must be positively swung to one side or the other as the standard 21 swings inwardly, so that the keeper lug 57 will pass beneath the cross brace 45. Then, as the lever 55 is released, it will automatically swing into vertical position to position the keeper lug 57 behind the brace 45. Since the latching lever 55 is of the pendulum type, it will stay in this latching position unless positively moved away from such position.

In order to partially counterbalance each standard 21 so that one man can move it between its retracted and extended positions, a pair of counterbalance units 60 are provided between the upper and lower frames 41 and 42, as shown in FIGURES 2, 3, 4 and 5. The upper end of each counterbalance unit 60 is pivoted, as at 61, to the upper frame 41 and its lower end is pivoted, as at 62, to the lower frame 42.

The counterbalance units 60 may be of any suitable type, but are preferably of the construction illustrated in detail in FIGURES 7 and 8. Each of the units 60 comprise an outer cylindrical casing 63 which is preferably made of two half-sections suitably bolted together, as at 63a. The upper end of the casing is open, as indicated, and its lower end is provided with a stop collar 64 which is fixed in a groove 65 formed in the inner wall of the casing. This collar supports an upstanding tube or sleeve 66 which is carried by a collar 67 resting on the collar 64. A compression spring 68 is disposed within the casing 63 and surrounds the sleeve 66 resting on the collar 67. The upper end of the spring 68 engages a collar 69 carried on the upper end of an elongated rod 70 and limited in its upward movement by a stop nut 70a fixed on the rod. The lower end portion of the rod 70 extends outwardly beyond the casing 63 and is provided with a clevis connection 72 pivoted on the pivot pin 62. The upper end of the casing is provided with a bifurcated strap 71 which is pivoted to the side of the upper frame 41 by means of the pivot pin 61. It will be apparent that the collar 69 on the rod 70 will cooperate with the upper end of the sleeve 66 to prevent undue compression of the spring 68.

Figure 5:
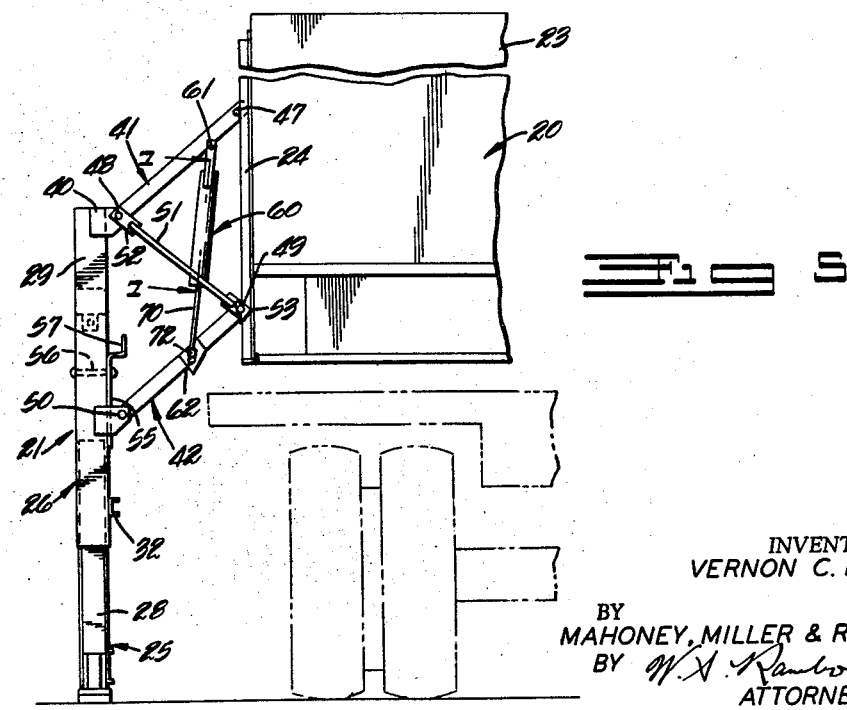
FIGURE 5 is a fragmentary rear elevational view taken from the position indicated at line 5—5 of FIGURE 4.

The relationship of the pivots 61 and 62, as indicated in FIGURE 5, is important in order to obtain the desired counterbalancing forces which tend to offset the weight of the standard and thus make it manageable by a single person. It will be noted from FIGURE 5 that the horizontal distance between the lower pivot point 62 and the pivot pin 49 is greater than the distance between the upper pivot point 61 and the upper pivot pin 47. Thus, a longer moment arm is provided at the lower end of the rod 70 than at the upper end of the strap 71 of the counterbalance unit. The spring 68 is under comparatively light compression when the frames 41 and 42 are swung to their uppermost position. As the frames 41 and 42 swing downwardly, the rod 70 is extended and the spring 68 is progressively compressed, due to the outwardly offset relationship of the pivot 62 relative to the pivot 61.

The spring 68 is gradually compressed during downward swinging of the linkage. Consequently, it pulls upwardly on the rod 70 and with equal force downwardly on the upper end of the cylinder 63. The net result is an upward counterbalance force which results from the difference in the lengths of the moment arms. The arrangement of the pivots 61 and 62 and the spring rate may be such that this upward counterbalance force almost balances the weight of the leg unit in all positions.

Thus, it will take little effort for one man to lift the standards 21 and move them into retracted positions. The collar 69 will engage the upper end of the tube 66 if the standard should swing downwardly too far because its foot 27 does not engage a supporting surface. However, normally these stops will not engage.

With this leg arrangement, it is possible to support the hopper 20 in elevated position at any desired location, as indicated in FIGURE 1. To set up the bin in this elevated position from the flat-bed of a truck or the like, the standards 21 will be swung laterally and downwardly into the position indicated in FIGURE 3. The standards will be locked in this position by the braces or stays 51. Then by using a pair of hydraulic jacks 75, which are indicated in FIGURE 4, the lower pedestal units 25 are extended downwardly to contact the ground and further extension of the jacks 75 will raise the bin off of the truck bed.

The cylinder of each hydraulic jack 75 is positioned in a stirrup or socket 76 provided on the associated foot 27. The upper end of the piston rod of the jack is detachably connected at 77 to the cross brace 31 of the main leg section 26. A source of hydraulic power and suitable control valves, not shown, can be provided on the truck, by which the jacks may be adjusted to support the weight of the hopper 20. At this time the pins 36 are removed to permit free telescoping movement of the lower pedestal section 25 relative to the upper main leg section 26.

When the bin has been raised to its desired elevated position, the pins 36 are reinserted to support the bin so that the jacks 75 can be removed. Consequently, the bin will stand in an elevated position, as indicated in FIGURE 1, with the feet 27 resting on the ground, the elongated feet tending to prevent tilting forwardly or rearwardly. After the flat-bed of the truck has been pulled forwardly from beneath the hopper, a container or distributing apparatus may be moved beneath or adjacent to the hopper 20 and material may be dispensed from the hopper to the container or distributing apparatus. It will be understood that the hopper will have the usual valving arrangement in the bottom thereof by which materials may be discharged from the hopper by gravity.

When it is desired to move the bin to a different location, a truck or the like may be backed to position the flat-bed thereof beneath the hopper, as shown in FIGURE 4. The jacks 75 are then reinstalled and the bin is raised slightly to relieve the load on pins 36. After removal of pins 36, the jacks can be lowered until the hopper settles onto the flat-bed of the truck. As the jacks are double acting, that is with power retraction as well as power extension, further retraction of the jacks will retract the pedestal leg sections 28 to the position indicated in FIGURE 3. Thereafter, the pins 36 may be repositioned to lock the leg sections 28 and 29 together in their fully retracted position. Next, the jacks are removed and the braces or stays 51 are released and each of the units 21 is swung upwardly and inwardly and is latched in place by engagement of the associated latch 55, as shown in FIGURE 10. The leg units 21 will thus be locked in their retracted upper position shown in FIGURES 2 and 10 flat against the hopper 20.

It will be apparent from the foregoing that this invention provides a portable bin which can be set up readily at any desired location. The novel leg units provide for operation by one man and are movable between retracted, inoperative positions and extended supporting positions. In inoperative position, the leg units are swung upwardly closely adjacent the ends of the hopper so that they will not extend beyond the width of the truck or other vehicle upon which the bin is being transported. The legs are locked effectively in either inoperative or operative positions.

Although a hopper for dispensing bulk materials in dry form is pictured and described, it should be understood that a tank or other container for liquids may be substituted for the hopper without departing from the scope of this invention.

Having thus described this invention, what is claimed is:

1. In a portable storage bin; a generally rectangular receptacle body having at each end thereof a vertically extensible and retractable supporting standard, each of said standards comprising a pair of vertically arranged, transversely spaced apart, tubular leg members; a pair of vertically arranged, transversely spaced pedestal members telescopically carried by said leg members and adjustable vertically thereon; an elongated, transversely disposed ground-engaging pedestal foot rigidly carried by said pedestal members at the lower ends thereof; locking means engageable with said leg members and said pedestal members for holding the latter in various vertically adjusted positions on said leg members; a pair of relatively parallel, vertically spaced, yoke-like frames having inner end portions pivotally connected with an end of said receptacle body and outer end portions pivotally connected with said leg members, said frames providing for unified swinging movement of said leg members between an upwardly retracted position closely adjacent an end of said receptacle body and a lowered extended position spaced outwardly and downwardly from said receptacle body; a rigid brace member detachably connectable between said frames for locking said frames against swinging movement when said leg members occupy said lower extended position; and latch means carried by one of said leg members and engageable with one of said frames for locking said leg members in their upwardly, retracted position.

2. A portable storage bin as defined in claim 1, including counterbalance means connected between said frames for counterbalancing at least a portion of the weight of said leg members, said pedestal members and said pedestal foot during swinging movement of said leg members between said retracted and extended positions.

3. A portable storage bin as defined in claim 2, wherein said counterbalance means comprises spring means connected between said yoke-like frames and arranged to resiliently urge said leg members toward their upwardly retracted position.

References Cited by the Examiner

UNITED STATES PATENTS

| 1,272,845 | 7/18 | Peck et al. | 248—280 |
|---|---|---|---|
| 2,678,737 | 5/54 | Mangrum | 214—515 X |
| 2,811,386 | 10/57 | Shaw | 214—515 X |
| 2,938,631 | 5/60 | Brey | 248—280 X |
| 3,119,503 | 1/64 | Herpich et al. | 214—515 |

FOREIGN PATENTS 1,067,324  1/54  France.

CLAUDE A. LE ROY, *Primary Examiner.*

FRANK L. ABBOTT, *Examiner.*